United States Patent [19]

Weyer

[11] Patent Number: 4,748,866
[45] Date of Patent: Jun. 7, 1988

[54] LINEAR HELICAL ACTUATOR

[76] Inventor: Paul P. Weyer, 48811 28th Ave., SE., Enumclaw, Wash. 98022

[21] Appl. No.: 903,733

[22] Filed: Sep. 3, 1986

Related U.S. Application Data

[63] Continuation-in-part of Ser. No. 881,904, Jul. 3, 1986, and Ser. No. 692,293, Jan. 17, 1985, Pat. No. 4,683,767.

[51] Int. Cl.$^4$ .................. F16H 29/20; F16H 55/18
[52] U.S. Cl. .................. 74/424.8 R; 74/89.15; 74/424.8 C; 74/441; 74/458
[58] Field of Search ........ 47/89.15, 424.8 R, 424.8 B, 47/424.8 C, 458, 459, 441; 464/180, 167; 384/906, 49; 403/359, 355, 356; 277/136, 137, DIG. 9, DIG. 7

[56] References Cited

U.S. PATENT DOCUMENTS

| | | | |
|---|---|---|---|
| 2,067,357 | 1/1937 | Terry | 74/424.8 |
| 2,131,151 | 9/1938 | Smith | 74/458 X |
| 2,488,256 | 11/1949 | Anderson | 74/424.8 C |
| 2,525,326 | 10/1950 | Wahlmark | 74/424.8 C |
| 2,791,128 | 5/1957 | Geyer et al. | 74/441 |
| 2,945,387 | 7/1960 | Geyer | 74/89 |
| 2,959,064 | 11/1960 | Geyer et al. | 74/441 |
| 3,020,775 | 2/1962 | Musser | 74/440 |
| 3,128,634 | 4/1964 | Eastman | 74/424.8 |
| 3,187,592 | 6/1965 | Geyer et al. | 74/89 |
| 3,333,483 | 8/1967 | Maci et al. | 74/424.8 |
| 3,406,584 | 10/1968 | Roantree | 74/424.8 |
| 3,437,271 | 4/1969 | Hammelmann | 92/31 X |
| 3,508,452 | 4/1970 | Roantree | 74/424.7 |
| 3,508,472 | 4/1970 | Hartwick, Jr. | 92/33 X |
| 3,577,796 | 5/1971 | Eissfeldt | 74/459 |
| 3,585,869 | 6/1971 | Lemor | 74/89.15 |
| 3,638,507 | 2/1972 | Orner | 74/424.8 |
| 3,670,583 | 6/1972 | Leming | 74/89.15 |
| 3,803,927 | 4/1974 | Lawler | 74/89.15 |
| 3,847,033 | 11/1974 | Toth | 74/459 |
| 3,861,226 | 1/1975 | Stanley | 74/89.15 |
| 3,965,761 | 6/1976 | Stanley | 74/89.15 |
| 4,022,076 | 5/1977 | Metz | 74/441 |
| 4,033,194 | 7/1977 | Stanley | 74/89.15 |
| 4,036,074 | 7/1977 | Bodnar | 74/409 |
| 4,050,319 | 9/1977 | Stanley | 74/89.15 |

(List continued on next page.)

FOREIGN PATENT DOCUMENTS

| | | |
|---|---|---|
| 2260300 | 6/1974 | Fed. Rep. of Germany . |
| 2803459 | 8/1979 | Fed. Rep. of Germany . |
| 3144306 | 5/1983 | Fed. Rep. of Germany . |
| 406747 | 8/1966 | France . |
| 7701097 | 1/1977 | France . |
| 0399084 | 10/1942 | Italy .................. 74/424.8 C |
| WO81/01440 | 5/1981 | PCT Int'l Appl. ............ 92/33 |
| WO81/03199 | 11/1981 | PCT Int'l Appl. ............ 92/33 |
| 386809 | 4/1965 | Switzerland . |
| 890440 | 2/1962 | United Kingdom . |
| 1362401 | 8/1974 | United Kingdom . |

OTHER PUBLICATIONS

Moscow Bauman Tech Coll., Week 84/20, issued Jun. 27, 1984.

Mechanisms, Linkages, and Mechanical Controls, Edited by Nicholas P. Chironis, McGraw-Hill Book Co., 12/1965, pp. 184–187.

Primary Examiner—Leslie A. Braun
Assistant Examiner—Scott Anchell
Attorney, Agent, or Firm—Seed and Berry

[57] ABSTRACT

A fluid-powered linear actuator having a body, and an output shaft with a piston portion disposed within the body. The shaft is axially movable in a first direction in response to fluid pressure on the shaft piston portion. A piston sleeve is mounted within the body and has a piston head to define with the shaft piston portion a fluid-tight chamber. A second fluid-tight chamber is provided on the opposite side of the piston head. Exterior sleeve splines transmit torque between the sleeve and the body in response to axial movement of the piston sleeve, and interior sleeve splines transmit axial force between the sleeve and the shaft in response to axial and rotational movement of the piston sleeve. In a preferred embodiment, the sleeve splines, and hence the corresponding splines on the body and shaft have the same hand with the lead of the interior splines being greater than the lead of the exterior splines so that the application of fluid pressure to the first chamber produces axial movement of the piston sleeve and the shaft in opposite directions, with the shaft moving in a first axial direction. The fluid pressure to the first chamber also applying pressure directly on the shaft piston portion to move the shaft in the first axial direction.

37 Claims, 3 Drawing Sheets

U.S. PATENT DOCUMENTS

| | | | |
|---|---|---|---|
| 4,276,003 | 6/1981 | Perkins et al. | 417/415 |
| 4,300,641 | 11/1981 | Kinkel | 92/33 X |
| 4,322,987 | 6/1982 | Gartner | 74/89.15 X |
| 4,337,671 | 7/1982 | Ulf | 74/424.8 C |
| 4,369,011 | 1/1983 | Ploss | 411/223 |
| 4,482,338 | 11/1984 | Walter et al. | 464/167 |
| 4,493,614 | 1/1985 | Chu et al. | 417/22 |
| 4,576,057 | 3/1986 | Saari | 74/424.8 C |
| 4,590,816 | 5/1986 | Weyer | 92/31 X |
| 4,593,576 | 6/1986 | Schindel | 74/89.15 X |

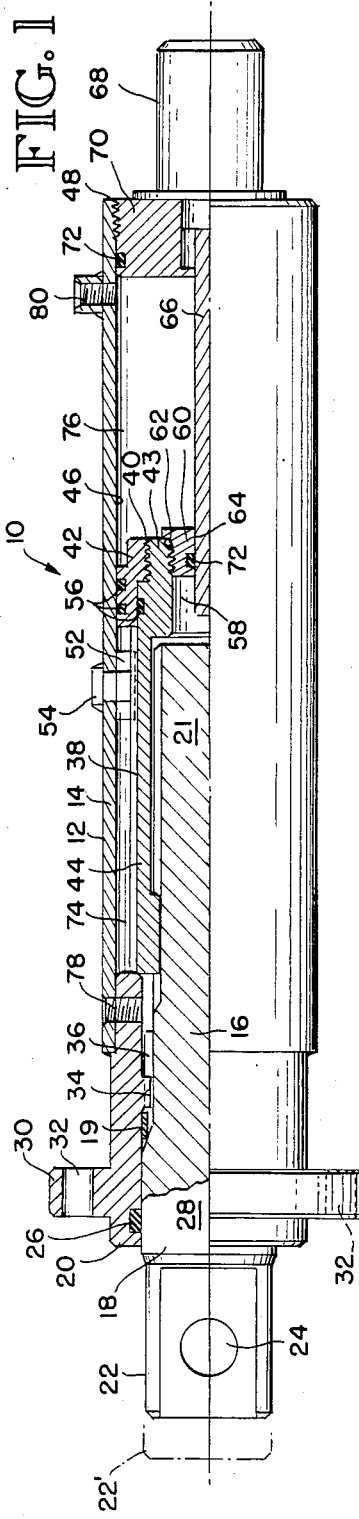

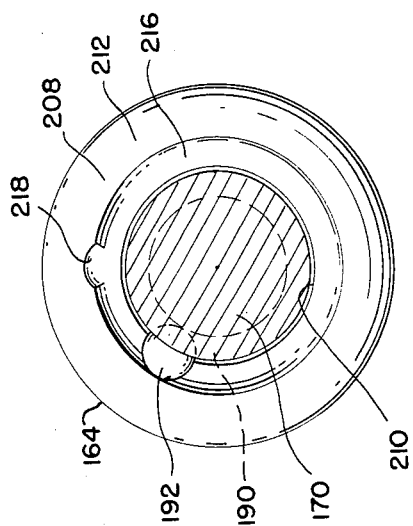
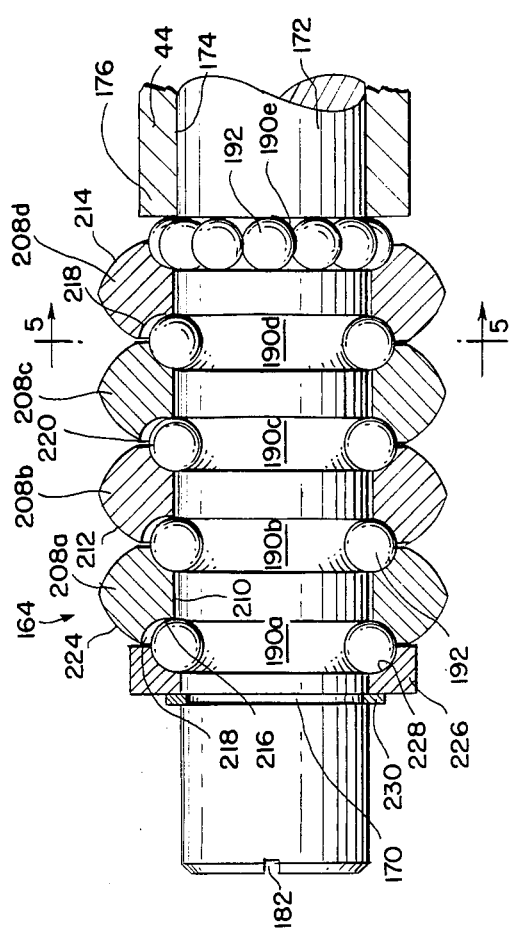

LINEAR HELICAL ACTUATOR

CROSS-REFERENCE TO RELATED APPLICATIONS

This is a continuation-in-part of application Ser. No. 692,293, entitled "Rotary Actuator with Backlash Elimination", filed Jan. 17, 1985, now issued as U.S. Pat. No. 4,683,767, and application Ser. No. 881,904, entitled "Fluid-Power Device Using Rollers", filed July 3, 1986.

TECHNICAL FIELD

The present invention relates generally to actuators, and more particularly, to fluid-powered linear actuators of the type in which axial movement of a piston produces relative linear movement between a body and an output member.

BACKGROUND OF THE INVENTION

Fluid-powered linear actuators are well known. While providing a relatively high linear output force, in some situations it is desirable to significantly increase the output force. Moreover, in certain situations the linear output member needs a short and accurate, but yet high power stroke. Sometimes it is desirable to also provide the linear output member with a limited rotational output.

Whenever using a reciprocating piston drive arrangement, as the piston reciprocally moves from one axial direction to the other in response to application of fluid pressure to the piston head, backlash results from the slack existing between the power-transmitting drive parts. While accurate machining will reduce the backlash problem, this procedure substantially increases the manufacturing cost. Even with accurate machining, conventional machining techniques are virtually incapable of totally eliminating the slack which produces the backlash problem. Furthermore, to the extent more accurate tolerances produce actuator parts which fit tightly together and reduce slack, assembly of the actuator becomes difficult. While accurate machining reduces slack initially, should the power-transmitting parts wear during usage or otherwise lose their original tolerances, no means exist for elimination of the slack that develops without disassembly of the actuator and possible remachining or replacement of the parts.

It will therefore be appreciated that there has been a significant need for a fluid-powered linear actuator having an exceptionally high power, short and accurate stroke linear output. Certain embodiments of the actuator should provide a limited degree of rotational output. Moreover, the actuator should not require exceptionally accurate machining of the power-transmitting parts to eliminate slack that produces backlash. The actuator should be easy to assemble and provide means for substantially complete elimination of the slack causing the backlash problem after the actuator is assembled. Elimination of the slack should be accomplished in a simple manner without requiring disassembly of the power-transmitting parts from the body. Furthermore, the means for elimination of the slack should, with one adjustment, simultaneously remove the slack existing between all of the power-transmitting parts within the body. The present invention fulfills this need and further provides other related advantages.

DISCLOSURE OF INVENTION

The present invention resides in a fluid-powered linear actuator. The actuator includes a body, and an output member disposed within the body and supported for axial movement relative to the body. The output member has to drive portion connectable to an external device. Means are provided for limiting the rotation of the output member relative to the body to provide a linear output with or without a rotational component.

The actuator further includes an axially reciprocating sleeve rotatably and reciprocately mounted within the body, and an axially reciprocating piston reciprocately mounted for the application of fluid pressure to one or the other opposing sides thereof to produce axial movement of the piston. The piston sleeve operatively engages the sleeve to axially move the sleeve in response to axial movement of the piston. In a preferred embodiment, the piston and sleeve are integrally formed as a piston sleeve.

The actuator includes first transmitting means for transmitting torque between the sleeve and the body in response to axial movement of the piston, and second transmitting means for transmitting axial and rotational force between the sleeve and the output member in response to axial and rotational movement of the sleeve. In alternative embodiments, the transmitting means are splines, ball races with balls disposed therein or ringed rollers.

The output member has a piston portion disposed within the body and axially movable in at least one axial direction in response to the application of fluid pressure to the output member piston portion. The output member piston portion is coaxially received within the sleeve.

The first transmitting means includes at least one helical groove formed on one of the sleeve or the body, and means for coacting with the groove of the first transmitting means for transmission of torque. The second transmitting means includes at least one helical groove formed on one of the sleeve or the output member, and means for coacting with the groove of the second transmitting means for the transmission of axial and rotational force. The grooves of the first and second transmitting means have selected hand and leads to produce a desired axial force on the output member. The application of fluid pressure to the first chamber applies both pressure on the output member piston portion to produce a first axial moving force on the output member drive portion and pressure on the piston to rotate the sleeve and through the first and second transmitting means produce a second axial force on the output member drive portion. The first and second axial moving forces are in the same or opposite axial direction depending upon the hand and lead selected for the grooves of the first and second transmitting means.

In a preferred embodiment of the invention, the grooves of the first and second transmitting means have the same hand turn with the lead of the groove of the second transmitting means being greater than the lead of the groove of the first transmitting means so that the application of fluid pressure to the first or second chamber produces axial movement of the piston and output member in axially outward directions. In particular, the application of fluid pressure to the first chamber applies both pressure on the output member piston portion to produce a first axially moving force on the output member drive portion in the first axial direction, and pressure on the piston head portion to move it in a second axial direction opposite to the first axial direction for rotation of the sleeve, and thereby through the first and second transmitting means to produce a second axial moving force on the output member in the first axial direction. As such, the first and second axial moving forces are in the same first axial direction and are additive to produce an increase axial output force on the output member.

The invention further includes means for elimination of backlash and preloading the first and second transmitting means, and means for eliminating backlash from the means used to limit the rotation of the output member.

Other features and advantages of the invention will become apparent from the following detailed description, taken in conjunction with the accompanying drawings.

BRIEF DESCRIPTION OF THE DRAWINGS

FIG. 1 is a side elevational, sectional view of a fluid-powered linear actuator embodying the present invention.

FIG. 2 is a side elevational, sectional view of an alternative embodiment of the linear actuator of FIG. 1.

FIG. 4 is an enlarged, fragmentary side elevational, partially sectional view of a roller of the type used in the actuator of FIG. 3.

FIG. 5 is a sectional view taken substantially along the line 5—5 of FIG. 4.

BEST MODE FOR CARRYING OUT THE INVENTION

Figure 3:
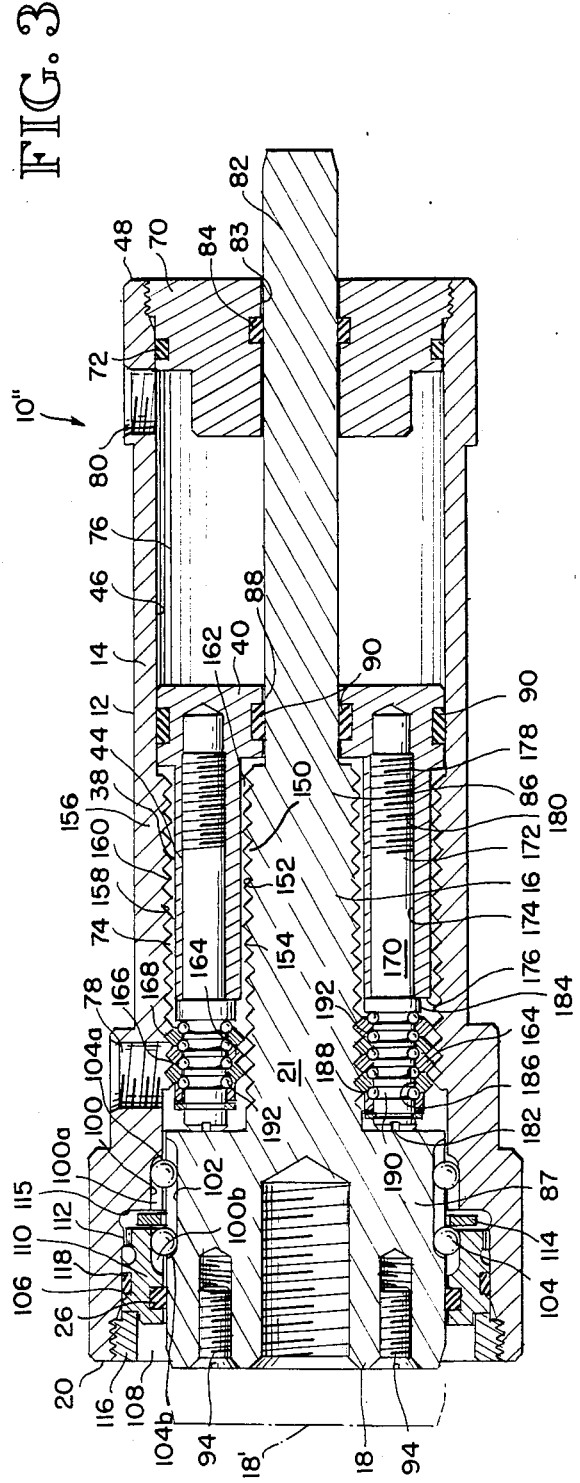
FIG. 3 is a side elevational, sectional view of another alternative embodiment of the invention using rollers.

As shown in the drawings for purposes of illustration, the present invention is embodied in a fluid-powered linear actuator, indicated generally by reference numeral 10. A first embodiment of the invention is shown in FIG. 1, and includes an elongated housing or body 12 having a cylindrical sidewall 14. An output shaft 16 is coaxially positioned within the body 12 and supported for axial movement relative to the body. The shaft 16 has a drive end portion 18 which extends axially outward beyond a first end 20 of the body 12 and a piston end portion 21 positioned within the body extending axially inward away from the first body end. The drive end portion 18 has a coupler portion 22 with an aperture 24 for attachment to an external device (not shown). A conventional seal 26 is provided between the body 12 and a smooth radially outward facing surface portion 28 of the shaft 16 toward the first body end 20 to prevent fluid leakage. A bearing ring 19 is disposed between the body 12 and the shaft 16 axially inward from the seal 26.

The body 12 has a radially outward projecting, circumferential extending attachment flange 30 with a plurality of circumferentially spaced attachment holes 32 extending through the flange for attachment of the body to a support frame (not shown). The invention may be practiced with the shaft 16 applying a linear driving force to the external device, or with the shaft being held stationary and the drive being provided by movement of the body 12. Other means than the coupler portion 22 may be used for attachment of the external device to the shaft.

The body 12 and the shaft 16 are provided with straight, axially extending and intermeshing guide splines 34 and 36, respectively. The splines 34 and 36 restrain the shaft 16 against rotational movement relative to the body 12, while permitting unrestrained axial movement of the shaft relative to the body. It is noted that the guide means to restrain the shaft against rotational movement may be provided by the frame to which the body is connected or the device to which the shaft is connected.

A piston sleeve 38 is coaxially and reciprocally mounted within the body 12. The piston sleeve 38 has a two-piece head portion 40 with an outer piston head ring 42 interiorly threaded to an inner piston head ring 43. The inner piston head ring 43 is formed integrally with an interiorly and exteriorly helically splined sleeve portion 44.

The head portion 40 is positioned for reciprocal movement along a smooth interior wall surface 46 of the body sidewall 14 located toward a second end 48 of the body 12 opposite the first body end 20. The shaft piston end portion 21 extends axially toward the second body end 48 and to within the sleeve portion 44 of the piston sleeve 38, but terminates short of the head portion 40. The shaft piston end portion 21 has exterior helical splines formed on a radially outward facing surface portion which intermesh and correspond in lead, lead angle and pitch with the interior splines of the sleeve portion 44. The exterior splines of the sleeve portion 44 intermesh with and correspond in lead, lead angle and pitch with interior helical splines formed on a fixed splined ring gear 52. The ring gear 52 is fixedly attached to the body sidewall 14 by a plurality of attachment pins 54 extending through the body sidewall and into the ring gear. The attachment pins 54 are welded to the body sidewall 14 in a sealed manner to prevent fluid leakage, and conventional seals 56 are provided between the outer piston head ring 42 and the smooth wall surface 46 of the body sidewall 14, and between the outer and inner piston rings 42 and 43 to prevent fluid leakage.

The inner piston ring 42 has a threaded central aperture 58 in which is threadably attached an exteriorly threaded annular magnetic pickup member 60. An "O"-ring seal 62 is provided between the inner piston ring 43 and the magnetic pickup member 60 to prevent fluid leakage. The magnetic pickup member 60 has a smooth bore central aperture 64 which is positioned around a rod 66 which extends axially inward from a linear differential transformer 68 positioned at the second body end 48, exterior of the body 12. The transformer 68 is attached to and closes a central aperture in an annular end cap 70 which is threadably attached to the body 12 at the second body end 48. Conventional seals 72 are provided between the magnetic pickup member 60 and the rod 66, and between the end cap 70 and the body 12 to prevent fluid leakage. In operation, the magnetic pickup member, the rod and the transformer provide a means to read the position of the piston sleeve within the body, and hence its rotation. Alternatively, an arrangement may be used to read the position of the shaft directly.

The head portion 40 of the piston sleeve 38 is positioned between the terminal end of the shaft piston end portion 21 and the end cap 70, and defines fluid-tight compartments 74 and 76, positioned to each side of the head portion 40, toward the first body end 20 and the second body end 48, respectively. Reciprocation of the piston sleeve 38 within the body 12 occurs when hydraulic fluid or air under pressure selectively enters through one or the other of a pair of ports 78 and 80 in the sidewall 14 which each communicate with one of the fluid-tight compartments 74 and 76, respectively.

The application of fluid pressure to the compartment 74 at the axially outward side of the head portion 40 toward the first body end 20 produces axial movement of the piston sleeve 38 toward the second body end 48. The application of fluid pressure to the compartment 76 at the axially outward side of the piston head portion 40 toward the second body end 48 produces axial movement of the piston sleeve 38 toward the first body end 20. The smooth interior wall surface 46 has sufficient axial length to accommodate the full stroke of the piston head portion 40 as the piston sleeve 38 reciprocates within the body 12.

As the piston sleeve 38 reciprocates between one or the other axial directions, torque is transmitted between the body 12 and the piston sleeve through the coaction of the intermeshing interior helical splines of the ring gear 52 and the exterior helical splines of the sleeve portion 44. The transmitted torque causes the piston sleeve 38 to rotate as it moves axially. The resulting axial and rotational movement of the piston sleeve 38 transmits both an axial and rotational force to the shaft 16 through the coaction of the intermeshing interior helical splines of the sleeve portion 44 and the exterior helical splines of the shaft. The force causes the shaft 16 to move axially relative to the body since rotational movement of the shaft is restrained by the straight splines 34 and 36. The fully extended position of the coupler portion 22 of the shaft 16 is shown in phantom line in FIG. 1 and indicated by reference numeral 22'.

When the intermeshing exterior helical splines of the sleeve portion 44 and the interior helical splines of the body ring gear 52 have the same hand or direction of turn as the intermeshing interior helical splines of the sleeve portion and the exterior helical splines of the shaft 16, the application of fluid pressure to the head portion 40 will cause the piston sleeve 38 to move axially relative to the body 12 in the opposite axial direction as the shaft 16 moves relative to the piston sleeve. Consequently, the resultant axial movement of the shaft 16 relative to the body 12 is determined by the difference between the axial movement of the piston sleeve 38 relative to the body and the axial movement of the shaft relative to the piston sleeve. Whichever has the greatest lead, the exterior helical splines of the sleeve portion (and ring gear) or the interior helical splines of the sleeve portion (and the shaft), will determine the direction of the resultant shaft. For example, if the interior sleeve portion splines are greater than the exterior splines, and fluid pressure is applied such as to move the piston sleeve toward the second body end, the axial movement of the shaft relative to the piston sleeve toward the first body end may be 5 inches while the axial movement of the piston sleeve relative to the body toward the second body end may be only 4 inches, hence the resultant shaft movement will be 1 inch toward the first body end. If the lead sizes of the splines are reversed the resultant shaft movement will be 1 inch toward the second body end. By careful selection of the leads for the exterior and interior helical splines of the sleeve portion 44, and hence the corresponding splines of the ring gear 52 and shaft 16 with which they intermesh, the direction and amount of axial movement of the shaft 16 relative to the body 12 produced by the application of fluid pressure can be carefully selected during the design of the actuator 10. An actuator with a very precise, short stroke of the shaft 16 can be provided using differential movement with the splines having the same hand. As used herein, the "lead" is the axial distance traveled by the piston sleeve for one complete revolution along a spline.

If the exterior and interior helical splines of the sleeve portion 44 and the corresponding splines of the ring gear 52 and the shaft 16, are selected with the opposite hand or direction of turn then compound axial movement of the shaft is produced. In other words, the application of fluid pressure to the head portion 40 will cause the piston sleeve 38 to move axially relative to the body 12 in the same axial direction as the shaft 16 moves relative to the piston sleeve. As such, the resultant axial movement of the shaft 16 relative to the body 12 is determined by adding the axial movement of the piston sleeve relative to the body and the axial movement of the shaft relative to the piston sleeve.

In addition to the above-described axial movement of the shaft 16 produced by the application of fluid pressure to the head portion 40, the application of fluid pressure to the fluid-tight compartment 74 through the port 78 also applies hydraulic pressure directly against the shaft piston end portion 21 in the axial outward direction toward the first body end 20. In other words, the surface area of the piston end portion 21 exposed to fluid pressure acts like a conventional piston and causes an axially outward force to be applied to the shaft 16. This force on the shaft 16 is in addition to whatever axial force is applied thereto by the application of fluid pressure to the head portion 40 of the piston sleeve 38.

As noted above, when the exterior and interior helical splines of the sleeve portion 44 have the same hand, differential movement is produced and fluid pressure applied to the the fluid-tight compartment 74 will cause the head portion 40 to move relative to the body 12 in the opposite axial direction as the shaft 16 moves relative to the piston sleeve 38. If the lead of the interior helical splines of the sleeve portion 44 is selected with a value greater than the lead of the exterior helical splines of the sleeve portion, the axial movement of the head portion 40 will be toward the second body end 48 and the piston sleeve 38 will apply an axial force on the shaft 16 in the opposite axial direction toward the first body end 20. This is in the same axial direction as the force applied directly by the fluid pressure against the shaft piston end portion 21 so that the forces are additive and an increase axial force is applied to the shaft 16 beyond that which would be produced by the application of fluid pressure on either the head portion 40 or the shaft piston end portion 21 alone. By utilizing differential movement the length of the shaft stroke or displacement is reduced, which further increases the shaft output force compared to the use of opposite hand splines since the output force increases the shorter the stroke.

It is noted that additive axial force is not realized when fluid pressure is applied to the fluid-tight compartment 76 since in that circumstance the fluid pressure is not also applied directly to the shaft piston end portion 21. As such, the actuator 10 is particularly well suited for those situations in which the shaft 16 is desired to have an output force in one axial direction greater than the output force in the opposite direction.

The following are sample calculations for an actuator of the design of FIG. 1 using the present invention to demonstrate the exceptionally high power, short and accurate axial output stroke achievable.

The actuator has a body ring gear 52 with a right hand spline having a lead of 7.875 inches, and a shaft piston end portion 21 with a right hand spline having a lead of 9.2 inches. The piston head portion 40 is selected with a 3.0 inch diameter and a stroke of 4.0 inches, which provides piston sleeve rotation relative to the body 12 for a 4 inch stroke toward second body end 48 of $$360° \times 4.0''/7.875 = 182.857°$$

with the rotation being counterclockwise when viewed from the second body end 48 with fluid pressure applied to port 78. This piston sleeve rotation produces a shaft 16 axial movement relative to the piston sleeve 38 of $$182.857°/360° \times 9.2 \text{ inches} = 4.673 \text{ inches}$$

with the axial movement being toward the first body end 20. The next axial displacement of the shaft 16 relative to the body 12 is 4.673 inches−4.000 inches=0.673 inches, with the movement being toward the first body end 20 (4.673 inches being the travel of the shaft toward the first body end relative to the piston sleeve, and 4.00 being the travel of the piston sleeve toward the second body end relative to the body).

This mechanical advantage of the spline arrangement of this example is:

$$\frac{4.000 \text{ inches (i.e., piston travel)}}{.673 \text{ inches (i.e., shaft travel)}}$$

and since the piston force is $$\frac{3.2 \text{ inches} \times Pi}{4} \times 3,000 \text{ psi or } 21,205 \text{ lbs.}$$

when using a 3,000 psi fluid pressure, the resultant force on the shaft toward the first body end is $$\frac{3.2 \text{ inches} \times Pi}{4} \times 3,000 \text{ psi} \times \frac{4.000}{.673} \text{ or } 126,037 \text{ lbs.}$$

Assuming an efficiency factor of 0.7, the force is 88,226 lbs.

In addition to this force, the hydraulic fluid is applied directly to the shaft piston end portion 21. The shaft piston end portion has an effective seal diameter of 2.25 inches. As such, the fluid applies a direct force of $$\frac{2.25^2 \text{ inches} \times Pi}{4} \times 3,000 \text{ psi} = 11,928 \text{ lbs.}$$

The total force on the shaft toward the first body end is, therefore, 100,154 lbs. This is a force 4.72 larger than the piston force produced by a standard 3 inch hydraulic cylinder.

An alternative embodiment actuator 10' utilizing the invention is shown in FIG. 2 with its first and second body ends 20 and 48, respectively, oriented reversed from that illustrated in FIG. 1. For ease of understanding and to minimize the unnecessary duplication of description, the same reference numerals used with the embodiment of FIG. 1 will be used for corresponding components of the embodiments of FIG. 2, and the description thereof will not be repeated.

In the embodiment of FIG. 2, the output shaft 16 extends within the body fully from the first body end 20 to the second body end 48, and has a smooth surface, reduced diameter end portion 82 which extends axially outward beyond the second body end through and beyond an aperture 83 in the annular end cap 70. A conventional seal 84 is provided between the shaft end portion 82 and the annular end cap 70 to prevent fluid leakage. A bearing 85 is also provided.

In this embodiment of the invention an enlarged diameter shaft mid-portion 86 and an even larger diameter shaft flange portion 87 form the shaft piston end portion 21 against which fluid pressure is applied by the application of pressurized fluid to the port 78. The reduced diameter end portion 82 extends from the shaft mid-portion 86 forming part of the shaft piston end portion 21 through a central aperture 88 in the head portion 40 of the piston sleeve 38. In this embodiment, the head portion 40 is a single piece annular head. Conventional seals 90 are provided between the head portion 40 and the smooth wall surface 46 of the body sidewall 14, and between the head portion and the shaft end portion 82 to prevent fluid leakage between the compartments 74 and 76.

The drive end portion 18 of the shaft 16 is the shaft flange portion 87 and has a plurality of circumferentially spaced bore holes 94 extending fully through the flange portion. The bore holes 94 are threaded to receive a threaded fastener (not shown) for attachment of the shaft to an external device (not shown). As will be described in more detail below, the bore holes 94 also serve as access ports for access to the interior of the body 12 to allow backlash adjustment without disassembling of the actuator 10'. The axially inward end of the bore holes 94 are each closed with a threaded sealing plug 98 when not in use for adjustment purposes to prevent the leakage of fluid therefrom.

To illustrate one advantage of the present invention, the actuator 10' of FIG. 2 is assumed to produce differential movement between the shaft 16 and the piston sleeve 38 with a 0.5 inch shaft axial movement toward the first body end 20 in response to a 1.5 inch piston sleeve axial motion toward the second body end 48 when fluid pressure is applied to port 78. As will be described below, this embodiment utilizes ball races rather than splines to transmit force, and the inner and outer ball channels formed by the ball races are assumed to have the same hand turn.

The force acting on the head portion 40 is determined by the relationship $$\frac{D_2^2 - D_3^2}{4} \times Pi \times P$$

where $P$ is the fluid pressure applied to the port, and $D_2$ is the outside diameter and $D_3$ is the inside diameter of the head portion 40. The force on the head portion 40 is multiplied by three to determine the force applied to the shaft since 1.5 inches of piston sleeve movement producing 0.5 inches of shaft movement results in a force multiplication factor of about three.

In addition to the force applied to the shaft as a result of the fluid pressure on the head portion 40, the fluid pressure acts on the shaft piston portion 21 directly with a force of $$\frac{D_1^2 - D_3^2}{4} \times Pi \times P$$

where $D_1$ is the outside diameter of the shaft piston portion. The above two calculations are each made subtracting the quantity $D_3{}^2$ to determine the effective surface area of the annular piston head portion 40 and the shaft piston portion 21 exposed to fluid pressure. Now, assuming that $D_1=D_2$, the total force applied to the shaft 16 is the sum of $$\frac{3 \times D_2{}^2 - D_3{}^2}{4} \times Pi \times P + \frac{D_1{}^2 - D_3{}^2}{4} \times Pi \times P =$$

$$\frac{3 \times D_2{}^2 - D_3{}^3}{4} \times Pi \times P + \frac{D_2{}^2 - D_3{}^3}{4} \times Pi \times P =$$

$$\frac{4 \times D_2{}^2 - D_3{}^2}{4} \times Pi \times P.$$

This force is four times the force produced by a normal hydraulic cylinder with the surface area of the shaft piston portion 40.

In the embodiment of FIG. 2, the body 12 and the shaft 16 are provided with straight, axially extending guide ball races 100 and 102, respectively. The ball races 100 and 102 are confronting and corresponding and define a ball race within in which are disposed a plurality of balls 104. The body ball race 100 is formed in two parts, 100a and 100b, with the first part 100a being formed integrally on the body sidewall 14 toward the first body end 20, positioned inward from an enlarged diameter interior sidewall portion 106 of the body sidewall 14 which extends therefrom to the first body end 20. An annular space 108 is defined between the enlarged diameter sidewall portion 106 and the shaft flange portion 87, and an annular member 110 is slidably disposed within the annular space. Helical and intermeshing splines 112 are formed on a part of the radially inward facing surface of the enlarged diameter sidewall portion 106 and a corresponding part of the radially outward facing surface of the annular member 110. The second ball race part 100b is formed on a radially inward facing surface of the annular member 110.

A ball-stop ring 114 is positioned between the axially inward end of the annular member 110 and a shoulder 115 formed at the transition between the body sidewall 14 on which the first ball race part 100a is formed and the enlarged diameter sidewall portion 106. At least one ball 104a of the balls 104 is positioned in the ball race part 100a and at least one ball 104b is positioned in the ball race part 100b. The ball race parts 100a and 100b each have an open race end which is blocked by the ball-stop ring 114. An exteriorly threaded adjustment ring 116 is threadably and adjustable attached to the body 112 at the first body end 20 within the annular space 108 and bears upon the axially outward end of the annular member 110.

In operation, the inward adjustment of the threaded adjustment ring 116 applies an axially inward force on the annular member 110. Through the helical splines 112, this axial force causes the annular member 110 to rotate. The inward adjustment of the ring 116 rotates the annular member 110 and carries the ball 104b in the ball race part 100b into firm seated contact with the ball race 102 formed on the shaft flange portion 87 to eliminate all slack therebetween. The continued inward adjustment of the ring 116 rotates the shaft 16 until the ball 104a in the ball race 102 is carried into firm seated contact with the ball race part 100a to eliminate all slack therebetween. Continued inward adjustment of the ring 116 after all slack has been removed from the ball races 100 and 102 will apply a desired axial loading on the ball races and balls therein. A conventional seal 118 is provided between the annular member 110 and the enlarged diameter sidewall portion 106 to prevent fluid leakage.

While the ball races 100 and 102 of FIG. 1 and the splines 34 and 36 of FIG. 2 have been described herein as being straight so as to restrain the shaft 16 against rotational movement relative to the body 12, the actuators can be constructed with helical splines and ball races which will allow a limited amount of rotation of the shaft as it moves axially. In such manner, the actuator can be provided with both linear and rotational output.

In the embodiment of FIG. 2, in addition to providing for backlash elimination with respect to the guide ball races 100 and 102, backlash elimination is also provided for the piston sleeve 38. In particular, an annular sleeve 120 is coaxially and reciprocally mounted within the body 12 about the shaft mid-portion 86 between the sleeve portion 44 and the shaft flange portion 78. A bearing ring 122 is positioned between the opposed, axially inward facing end wall of the sleeve portion 44 and the sleeve 120. The sleeve portion 44 and the sleeve 120 are independently and adjustably rotatable, and axially movable relative to each other within at least a limited range for backlash elimination purpose, and are in slidable engagement with each other through the bearing ring 122.

A helical ball race 124 is formed on the shaft mid-portion 86 confronting and corresponding to a pair of helical ball races 126 formed on the radially inward facing wall of each of the sleeve portion 44 and the sleeve 120. The ball races 124 and 126 have substantially identical lead and pitch and form a pair of inner ball channels.

The body sidewall 14 has a helical ball race 128 formed thereon confronting and corresponding to a pair of ball races 130 formed on the radially outward facing wall of each of the sleeve portion 44 and the sleeve 120. The ball races 128 and 130 have substantial identical lead and pitch and form a pair of outer ball channels.

A plurality of balls 132 are disposed in each of the inner and outer channels for transmission of force between the sleeve portion 44 and the shaft 16, between the sleeve portion and the body sidewall 14, between the sleeve 120 and the shaft, and between the sleeve and the body sidewall. The bearing ring 122 serves as a ball stop, as do certain of the blocked ends of the ball races to engage and limit travel of the balls 132 and to regroup the balls. The end of the ball race 128 toward the second body end 48 is open into the interior of the body 12 and a ball stop 134 extends through the body sidewall 14. The ball stop 134 is held in position at the open end of the ball race 128 by a threaded cap plug 136.

As the piston sleeve 44 and the sleeve 120 axially reciprocate between one or the other axial directions within the body 12, torque is transmitted by the balls 132 through the coaction of the ball race 128 on the body sidewall 14 with the ball race 130 on the sleeve portion 44 and the sleeve 120. The transmitted torque causes the piston sleeve 38 and the sleeve 120 to rotate as they move axially. The resulting linear and rotational movement of the piston sleeve 44 and the sleeve 120 transmits axial and rotational force to the shaft 16 by the balls 132 through the coaction of the ball races 126 on the sleeve portion 44 and the sleeve 120 with the ball race 124 on the shaft. Since rotational movement of the shaft 16 relative to the body 12 is restricted by the guide ball races 100 and 102, the force transmitted to the shaft 16 causes it to move axially relative to the body. The shaft 16 is shown with its drive end 18 fully retracted in FIG. 2, with the fully extended position of the drive end shown in phantom line and indicated by the reference number 18'.

The actuator 10' of FIG. 2 is further provided with an axially extendable set screw 138 threadably received in a threaded axial bore 140 extending fully through the sleeve 120. The set screw 138 is inwardly adjustable to project from the sleeve 120 and engage the bearing ring 122 and therethrough apply an adjustable and oppositely directed axially outward force on each of the sleeve portion 44 and the sleeve 120. The force moves the piston sleeve 44 relative to the sleeve 120 to substantially eliminate all backlash resulting from the inner and outer ball channels and for axially preloading the piston sleeve and the sleeve. The access ports 94 and the shaft flange portion 87 are radially and circumferentially positioned to be aligned with the bore 140 in the sleeve 120 for access to the set screws 138 for their adjustment without disassembly of the piston sleeve the body 12. Preferably the actuator is provided with several set screws 138 circumferentially spaced about the sleeve 120 in a balanced arrangement.

In operation, the inward adjustment of the set screw 138 applies an axially outward directed force on the piston portion 44 and the sleeve 120 which operates to eliminate the slack between the ball races and accomplish axial preloading. Backlash results from the slack or free movement between the force-transmitting parts of the actuator. The slack is usually due to the sizing of the ball races and balls 132 positioned therein, which transmit force between the piston sleeve 44 and the sleeve 120 and both the body 12 and the shaft 16.

For ease of explanation, the elimination of slack will first be described assuming the inner and outer helical ball channels exhibit the same degree of slack. The inward adjustment of the set screws 138 when adjustably extended axially separate the sleeve portion 44 and the sleeve 120 and applies an equal and oppositely directed axially outward force to each of the sleeve portion and the sleeve. The outward force moves the sleeve 120 axially toward the first body end 20 and carries the balls 132 in the helical ball race 126 formed on the helical sleeve into firm seated contact with the corresponding helical ball race 124 formed on the shaft mid-portion 86 to eliminate all slack therebetween. Simultaneously, the axially movement of the sleeve 120 carries the balls 132 in the helical ball race 132 formed on the sleeve into firm seated contact with the helical ball race 128 formed on the body sidewall 14 to eliminate all slack therebetween.

The outward force also moves the sleeve portion 44 axially toward the second body end wall 48 and carries the balls 132 in the helical ball race 126 formed on the sleeve portion into firm seated contact with the corresponding helical ball race 124 formed on the shaft mid-portion 86 to eliminate all slack therebetween. Simultaneously, the axial movement of the sleeve portion 44 carries the balls 132 in the helical ball race 130 formed on the sleeve portion into 44 into firm seated contact with the helical ball race 128 formed on the body sidewall 14 to eliminate all slack therebetween.

Should the slack in one of the outer or inner helical channels exceed the slack in the other, the axially outward force exerted by the continued inward adjustment of the set screws 138 on the sleeves portion 44 and the sleeve 120 after the slack has been completely eliminated from the channel with the lesser slack, will cause the sleeve portion and the sleeve to rotate in opposite directions and move them axially apart until the excess slack is eliminated. Since the sleeve portion 44 and the sleeve 120 are free to rotate independently and move axially relative to each other, when the helical channel with the lesser slack has all slack removed, that channel will cause the rotation of the sleeve portion and the sleeve in opposite rotational directions in response to the axially outward force still being applied by the set screws 138. The rotation will continue and produce axial separation of the sleeve portion 44 and the sleeve 120 until the balls 132 of the helical ball races forming the channel with the excess slack are carried into firm seated contact with the corresponding and confronting helical ball races forming the channel.

At such time that the sleeve portion 44 and the sleeve 120 will have rotated sufficiently apart to produce enough axial separation to eliminate all slack in the force transmitting member, a steady state will be reached and all backlash eliminated. Further, inward adjustment of the set screws 138 can be made to apply a desired axial preloading force on the sleeve portion 44 and the sleeve 120.

Upon the application of fluid pressure to one or the other of the fluid-tight compartments 74 and 76 during fluid powered operation of the actuator 10', the piston sleeve 38 and the sleeve 120 move in unison, with substantially all backlash eliminated as the piston sleeve and the sleeve reciprocate within the body 12. Should usage of the actuator cause wear of the ball races or the balls therein, or should slack occur for any other reason, the slack can be easily removed in the same manner described above by further adjustment of the set screws 138 without disassembly of the piston sleeve 38 and the sleeve 120 from the body.

With the backlash elimination of the present invention, the ball races 124, 126, 128 and 130 may be machined using conventional machining techniques with standard tolerances, and the slack which creates the backlash problem can be eliminated by adjustment prior to fluid-powered operation of the actuator. Furthermore, the ball races can be machined with a size to permit easy assembly of the actuator and any slack thereby introduced can be eliminated by adjustment. It is noted that all slack in the inner and outer channels is eliminated simultaneously with one easy external adjustment of the set screws 138.

It is to be understood that while the embodiment of the invention just described show ball races with balls as the form of force transmission, the backlash elimination described can be used to eliminate the slack found with splines or roller bearings, or other force-transmitting means.

In FIG. 3, an alternative embodiment of the actuator 10" similar to that of FIG. 2 is shown using roller bearings. Corresponding components will be provided with the same reference numerals, and the description thereof will not be repeated. With this embodiment, the bore holes 94 do not extend fully through the flange portion 87 since they do not serve as access ports.

In the embodiment of FIG. 3, an outward facing surface portion 150 of the shaft mid-portion 86 has cut therein a plurality of helical grooves 152 having the same lead angle and a uniform lead and axial pitch. The helical shaft grooves 152 extend about the shaft 16 and have helical ridges 154 therebetween. An inward facing surface portion 156 of the body sidewall 14 toward the first body end 20 has cut therein a plurality of helical grooves 158 having the same lead angle and a uniform lead and axial pitch. The helical body grooves 158 extend about the body sidewall 14 and have helical ridges 160 therebetween. The grooved inward body surface portion 156 is located generally opposite the grooved outward shaft surface portion 150 and spaced apart radially outward therefrom to define a circumferential space 162 therebetween.

The helical body grooves 158 have the same hand or direction of turn from the helical shaft grooves 152, and have substantially the same axial pitch as the helical shaft grooves 152. In the embodiment of FIG. 3, the helical body grooves 158 are right hand, and the helical shaft grooves 152 are right hand. The grooved inward body surface portion 156 has a first pitch diameter (PD1) of 1.875 inches and a first lead (L1) of 2.5 inches, and the grooved outward shaft surface portion 150 has a second pitch diameter (PD2) of 0.750 inches and a second lead (L2) of 1.0 inches, with the pitch diameters and helical groove leads sized substantially according to the relationship:

$$PD1/PD2 = L1/L2$$

This relationship causes free rolling of a plurality of rollers 164 disposed in the circumferential space 162, as will be described below, in that the shaft rotation which results from the planetary action precisely matches the shaft rotation which results from the rollers rolling along the helical body and shaft grooves 158 and 152. While this design is preferred since it eliminates any scuffing or slippage of the rollers 164 as the actuator 10" operates, and thus eliminates sliding friction and achieves the benefit of rolling friction, the actuator may be manufactured without the components perfectly matched, such that while the rollers do roll they also tend to slide somewhat.

As used herein "lead angle" is the helix angle of a helical groove, "lead" is the linear advance resulting from one full revolution along a helical groove, "pitch" is the axial distance between adjacent helical grooves, "pitch diameter" is the diameter of the grooved part measured from the groove half-depth position.

As noted above, the actuator 10" is provided with a plurality of elongated force transmitting rollers 164 disposed in the circumferential space 162 between the grooved inward body surface portion 156 and the grooved outward shaft surface portion 150. The rollers 164 each have cut in the outward facing surface thereof a plurality of circumferential grooves 166 with circumferential ridges 168 therebetween. The circumferential grooves 166 extend about the roller 164 in parallel spaced apart radial planes. The circumferential grooves 166 of the rollers 164 have substantially the same axial pitch as the helical body and shaft grooves 158 and 152. The groove spacing of the roller must correspond to the axial pitch or groove spacing of the shaft and body with which the roller grooves mesh.

The rollers 164 are rotatably retained in fixed axial and circumferential position relative to the piston sleeve 38 as the piston sleeve reciprocates within the body 12 during fluid-powered operation of the actuator 10" by a plurality of cylindrical shaft spindles 170. Each of the spindles 170 has a coaxially extending and integrally formed support arm portion 172. The support arm portions 172 are disposed in a plurality of bore holes 174 formed in an axially outward end wall 176 the sleeve portion 44 facing toward the first body end 20. The bore holes 176 are evenly circumferentially spaced-apart about the sleeve portion 44.

In the embodiment shown in FIG. 3, the rollers 164 are radially offset from each circumferentially adjacent roller with every other one of the rollers being in seated engagement with only the helical body grooves 158 or with only the helical shaft grooves 152. The roller offset is achieved by radially offsetting the bore holes 174 which receive the support arm portions 172. The bore holes 174 are positioned such that circumferentially adjacent rollers of the rollers 164 are in nested arrangement in seated engagement with each other. To facilitate the nesting, the radially outward rollers forming an outward set of rollers have only three ridges and are axially offset so that the three ridges nest in the three valleys of the radially inward rollers forming an inward set of rollers which have four ridges. With this arrangement, the helical body and shaft grooves 158 and 152 have the same hand to utilize differential rotation without realizing roller scuffing or slipping since each of the rollers 164 engages only one or the other of the helical body or shaft grooves 158 or 152.

The support arm portion 172 has an exterior threaded end portion 178 threadably received in an interior threaded end portion 180 of its corresponding bore hole 176. The support arm threaded end portion 178 may be threaded into the bore hole threaded end portion 180 by turning the spindle 170 using a slot 182 cut in the axial end face thereof. The support arm portion 172 has a radially outward extending flange 184 which engages the sleeve portion end wall 176 when the support arm portion is fully threaded into the bore hole 176. The flange 184 for the outward set of rollers has an axial thickness sufficient to axially offset the outward set of rollers so the roller ridges nest with the valleys of the inward set of rollers, as described above. As will be described in more detail below, certain of the support arm portions 172 are adjusted so as to not be fully seated against the flange 184 for backlash elimination purposes.

The spindles 170 project into the circumferential space 162 and hold the rollers 164 restrained against axial movement relative to the spindles for rotation about the spindles on axes in parallel axial alignment with the body 12. The spindles 170 also retain the rollers 164 in circumferentially distributed, spaced apart positions within the circumferential space 162 about the shaft 16 with each of the rollers in seated engagement and coacting with the helical body grooves 158 and the helical shaft grooves 152 for transmitting force between the body 12, the shaft 16 and the piston sleeve 38. Each ridge 168 of the rollers 164 is positioned for rolling travel in corresponding grooves of both the helical body grooves 158 and the helical shaft grooves 152.

The spindles 170 are arranged in parallel axial alignment with the body 12 and each have one of the roller 164 coaxially and rotatably retained thereon and restrained against axial movement relative to the spindle. The rollers 164 each have a longitudinally extending coaxial roller bore 186 therethrough for rotatably receiving one of the spindles 170. The corresponding roller bore sidewall and spindle exterior surface have formed thereon a plurality of confronting and corresponding ball races 188 and 190, respectively, defining a plurality of ball channels extending circumferentially thereabout.

A plurality of balls 192 are seated in each of the ball channels formed by the ball races 188 and 190 to prevent axial movement of the roller 164 relative to the spindle 170 against axial thrust encountered during powered operation while permitting free rotation of the roller on the spindle. A sufficient number of balls and ball channels must be used to handle extremely large axial loads encountered during operation.

As best shown in FIGS. 4 and 5, each roller 164 in the inward set of rollers includes four annular roller disks 208 indicated by the reference letters a, b, c and d disposed on the spindle 170 in juxtaposition and operating together to form the roller. The rollers of the outward set of rollers are similarly constructed except they have only three disks, and will not be specifically described.

Each of the roller disks 208 has a coaxial opening 210 therethrough sized to slide axially on the spindle 170 during assembly and for free rotation of the disk about the spindle during powered operation. Each of the roller disks has first and second axially outward and oppositely facing first and second sidewalls 212 and 214, respectively. The sidewalls 212 and 214 each have an axially outward opening circumferential ball groove 216 formed thereon extending about the central opening 210 of the roller disk 208.

The first and second sidewalls 212 and 214 of each roller disk 208 and the ball grooves 216 formed thereon are axially spaced apart to correspond with the axial positioning of the ball grooves 190 formed on the spindle 170. The roller disks 208 are disposed on the spindle 170 with the second sidewall 214 of one disk in juxtaposition with the first sidewall 212 of the next adjacent disk. As such, the ball groove 216 in the second sidewall 214 of one disk and the ball groove of the first sidewall 212 of the next adjacent disk form the roller ball race 188 which with the corresponding ball race 190 of the spindle 170 forms one of the ball channels containing the roller balls 192. As shown in FIG. 4, the four roller disks 208a, b, c and d comprising one roller 164 coact with five spindle ball races 190, indicated by the reference letters a, b, c, d and e.

The roller disk ball grooves 216 are cut to form substantially one quarter of the circumferential wall of a ball channel, and as such, each sufficiently overlays the corresponding spindle ball race 190 to retain without assistance the balls 192 in the corresponding spindle ball race. To allow for loading of the balls 192 into the ball race 190 once the roller disk 208 is in position on the spindle 170, a ball loading opening 218 is provided in the first sidewall 212 of the roller disk. The loading opening 218 connects with the ball groove 216 formed in the roller disk first sidewall 212, and extends radially away from the spindle 170 by an amount sufficient to receive and pass balls into the spindle ball race 190 with the roller disk 208 in operative position on the spindle, that is, with the ball groove 216 in its roller disk second sidewall 214 in engagement with the balls 192 disposed in the corresponding spindle ball race 190.

The roller 164 comprised of the roller disks 208 is assembled on the spindle 170 by first loading a set of ball 192 in the axially innermost spindle ball race 190e toward the second body end 48. The fourth roller disk 208d is then slid along the spindle 170 from its free end in which the slot 182 is formed to bring the ball groove 216 in the second sidewall 214 of the roller disk into seated engagement with the balls. This results with the loading opening 218 of the fourth roller disk 208d facing axially outward toward the first body end 20. Next, another set of the balls 192 is loaded through the loading opening 218 in the first sidewall 214 of the roller disc 208d to fill the corresponding spindle ball race 190d. As just described for the roller disk 208d, the next roller disc 208c is then slid into position with the ball groove 216 in its second sidewall 214 in seated engagement with the balls in the spindle ball race 190d. This assembly procedure is continued until the spindle ball race 190a is loaded with a set of the balls.

The second sidewall 214 of each of the roller disks 208 has a radial circumferential flat sidewall portion 220 which is radially positioned to block the ball loading opening 218 in the first sidewall 212 of the next adjacent roller disk and prevent balls from exiting therethrough during fluid-powered operation of the actuator.

A retainer ring 226 is mounted on each spindle 170 axially outward of the first roller disk 208a, and has an axially inward opening circumferential ball groove 228 formed thereon which corresponds to the ball groove 216 of the first roller disk. The retainer ring 226 projects radially outward sufficient to block the ball loading opening 218 in the first roller disk 208a. A split ring 230 is seated in a circumferential groove on the spindle 170, axially outward of the retainer ring 226, to hold the retainer ring in place. In effect, the retainer ring ball groove 228 forms the missing quarter section of the ball channel with the ball race 216 in the first sidewall portion 212 of the roller disk 208a and with the spindle roller race 190a.

Each of the roller disks 208 has a radially outward facing surface portion 224 shaped to form in combination with the outward facing surface portions of the other roller disks comprising the roller 164, the desired grooves 166 and ridges 168 contour of the roller.

Still referring to the embodiment of FIG. 3, the actuator 10" is provided with means for eliminating backlash in the force-transmitting parts and for axially preloading of the piston sleeve 38 and the rollers 164. Backlash results for the slack or free movement between the force-transmitting parts of the actuator. The slack is usually due to the sizing of the grooves of the body 12, piston sleeve 38, and shaft 16, and the rollers 164 positioned therein, which transmit force between the body and the shaft through the piston sleeve. Backlash occurs as the piston sleeve 38 moves from one axial direction to the other within the body as it reciprocates.

As previously described, the spindle support arm portion 172 has a threaded end portion 178 threadably received in an interior threaded end portion 180 of the sleeve bore hole 174. Circumferentially alternate support arm portions 172 are fully threaded into the sleeve 44 with the flange 184 in seated engagement with the sleeve portion end wall 176, and not moved. Preferably every other of the support arm portions 172 is intended to be selectively and adjustably movable in their sleeve bore holes 174 for the purpose of backlash elimination prior to commencing fluid powered operation. The adjusting axial movement of every other of the support arm portions 172, and thus the spindles 170 extending therefrom and the rollers 164 rotatably retained thereby, relative to the stationary support arm portions, and thus the spindles extending therefrom and the rollers rotatably retained thereby, tends to eliminate backlash by reducing the slack between the rollers and the helical body and shaft grooves 158 and 152 which coact with the rollers. When all slack between either the rollers and the helical body grooves or the rollers and the shaft grooves has been eliminated, further axial adjustment will apply an axial preloading force on the piston sleeve and the rollers.

With the present invention, the grooves may be machined using conventional machining techniques with standard tolerances, and the slack which creates the backlash problem can be eliminated by adjustment prior to fluid-powered operation of the actuator 10". Furthermore, the grooves can be machined with a size to permit easy assembly of the actuator and the slack thereby introduced can be eliminated by adjustment. It is noted that the backlash elimination described will eliminate an equal amount of slack between the rollers and the helical body and between the rollers and the shaft grooves.

It will be appreciated that, although specific embodiments of the invention have been described herein for purposes of illustration, various modifications may be made without departing from the spirit and scope of the invention. Accordingly, the invention is not limited except by the appended claims.

I claim:

1. A fluid-powered linear actuator, comprising:

a body;

an output member supported for axial movement relative to said body, said output member having a drive portion connectable to an external device and having a piston portion disposed within said body, said output member drive portion being axially movable in at least one axial direction in response to application of fluid pressure on said output member piston portion;

means for limiting the rotation of said output member relative to said body;

an axially reciprocating sleeve rotatably and reciprocally mounted within said body, said sleeve receiving said output member therewithin;

an axially reciprocating piston reciprocally mounted within said body to define with said output member piston portion a first fluid-tight interior body chamber therebetween and to define a second fluid-tight interior body chamber to an opposite side of said piston head portion from said first chamber, said piston operatively engaging said sleeve to axially move said sleeve in response to axial movement of said piston;

first transmitting means for transmitting torque between said sleeve and said body in response to axial movement of said piston, including at least one helical groove formed on one of said sleeve or said body and means for coating with said groove of said first transmitting means for the transmission of torque; and second transmitting means for transmitting axial and rotational force between said sleeve and said output member in response to axial and rotational movement of said sleeve, including at least one helical groove formed on one of said sleeve or said output member and means for coacting with said groove of said second transmitting means for the transmission of axial and rotational force, said grooves of said first and second transmitting means having selected hand and leads to produce a desired axial movement of said output member, the application of fluid pressure to said first chamber applying both pressure on said output member piston portion to produce a first axial moving force on said output member drive portion and pressure on said piston to rotate said sleeve and through said first and second transmitting means produce a second axial moving force on said output member drive portion, said first and second axial moving forces being in the same or opposite axial direction depending on the hand and leads selected for said grooves of said first and second transmitting means, the application of fluid pressure to said second chamber applying an axial moving force on said output member opposite in direction from the moving force resultant from said first and second axial moving forces produced by applying fluid pressure to said first chamber, whereby the ability to select the size of said output member piston portion relative to said piston and to select the hand and leads of said grooves of said first and second transmitting means permits the construction of a linear actuator with precise throw and rated output force.

2. A fluid-powered linear actuator, comprising:

a body;

an output member supported for axial movement relative to said body and restrained against rotational movement relative to said body, said output member having a drive portion connectable to an external device and having a piston portion disposed within said body, said output member drive portion being axially movable in at least a first axial direction in response to application of fluid pressure on said output member piston portion;

an axially reciprocating piston sleeve rotatably and reciprocally mounted within said body and having a sleeve portion and a piston head portion, said sleeve portion receiving said output member therewith, said piston head portion being disposed within said body to define with said output member piston portion a first fluid-tight interior body chamber therebetween and to define a second fluid-tight interior body chamber to an opposite side of said piston head portion from said first chamber;

first transmitting means for transmitting torque between said sleeve portion and said body in response to axial movement of said piston sleeve, including at least one helical groove formed on one of said sleeve portion or said body and means for coating with said groove of said first transmitting means to transmit torque; and second transmitting means for transmitting axial force between said sleeve portion and said output member in response to axial and rotational movement of said piston sleeve, including at least one helical groove formed on one of said sleeve portion or said output member and means for coacting with said groove of said second transmitting means to transmit axial force, said grooves of said first and second transmitting means having the same hand with the lead of said groove of said second transmitting means being greater than the lead of said groove of said first transmitting means so that the application of fluid pressure to said first or second chamber produces axial movement of said piston sleeve and output member in axially opposite directions, the application of fluid pressure to said first chamber applying both pressure on said output member piston portion to produce a first axial moving force on said output member drive portion in said first axial direction and pressure on said piston head portion to move in a second axial direction opposite to said first axial direction and rotate said sleeve portion, thereby through said first and second transmitting means producing a second axial moving force on said output member drive portion in said first axial direction, said first and second axial moving forces being in said first axial direction and additive, whereby increased axial output force on said output member results beyond that produced by fluid pressure on said piston head portion alone, the application of fluid pressure to said second chamber applying an axial moving force on said output member in said second axial direction.

3. The actuator of claim 2 wherein said output member is an elongated unitary member axially aligned within said body, said output member drive portion extends outward from one axial end of said body, said second transmitting means including coacting helical grooves formed on said output member piston portion and on a radially inward facing wall of said sleeve portion.

4. The actuator of claim 3 wherein said first transmitting means includes coacting helical grooves formed on a ring gear attached to said body and on a radially outward facing wall of said sleeve portion.

5. The actuator of claim 2 further including an axially reciprocating sleeve member rotatably and reciprocally mounted within said body axially adjacent to said sleeve portion, said sleeve member and sleeve portion being independently and adjustably rotatable and axially movable relative to each other within at least a limited range, third transmitting means for transmitting torque between said sleeve member and said body in response to axial movement of said piston sleeve, including at least one helical groove formed on one of said sleeve member or said body and means for coacting with said groove of said third transmitting means to transmit torque, fourth transmitting means for transmitting axial force between sleeve member and said output member in response to axial and rotational movement of said piston sleeve, including at least one helical groove formed on one of a said sleeve member or said output member and means for coacting with said groove of said fourth transmitting means to transmit axial force, said grooves of said third and fourth transmitting means having the same hand and lead as the corresponding grooves of said first and second transmitting means, and further including first adjustment means for selectively and adjustably moving said sleeve member in one or the other of a rotational or axial direction relative to said sleeve portion while allowing at least one of said sleeve member or sleeve portion to move independently relative to the other in response thereto within said limited range by an amount sufficient to substantially eliminate all backlash resulting from said first, second, third and fourth transmitting means as said piston head portion moves from one axial direction to the other to produce relative axial movement between said body and said output member.

6. The actuator of claim 5 wherein said first adjustment means includes an adjustment member extending between and engaging each of said sleeve member and sleeve portion, said adjusting member being adjustably extendable for providing a selectable and oppositely directed axial force on said sleeve member and sleeve portion to move said sleeve member axially relative to said sleeve portion by an amount sufficient to substantially eliminate all backlash.

7. The actuator of claim 6 wherein said adjustment member is adjustably attached to said sleeve member and projects toward and slidably engages said sleeve portion, said adjustable member being selectively extendable to exert an axially outward force on said sleeve member and sleeve portion.

8. The actuator of claim 5 wherein said grooves of said first, second, third and fourth transmitting means and said means for coacting therewith are intermeshing splines.

9. The actuator of claim 5 wherein said grooves of said first, second, third and fourth transmitting means and means for coacting therewith are ball races positioned in confronting and corresponding relationship to form ball channels, said first, second, third and fourth transmitting means further including one or more balls seated in each of said ball channels.

10. The actuator of claim 2 wherein said output member is restrained against rotational movement relative to said body by at least one straight axially extending groove formed on said body and at least one straight axially extending groove formed on said output member coacting with each other, and further includes adjustment means for elimination of backlash resulting from said straight grooves.

11. The actuator of claim 10 wherein said adjustment means includes an annular member rotatably disposed within said body with at least one straight axially extending groove formed thereon coacting with said straight groove of said output member, said annular member being independently and adjustably rotatable relative to said output member and body within at least a limited adjustment range, anf further includes annular member adjustment means for selectively and adjustably rotating said annular member relative to said output member and body within said adjustment range by an amount sufficient to eliminate backlash resulting from said straight grooves.

12. The actuator of claim 11 wherein said annular member adjustment means includes at least one helical adjustment groove formed on said annular member and at least one helical adjustment groove formed on said body or output member coacting with each other, and means for selectively and adjustably moving said annular member in the axial direction to cause rotation of said annular member through coaction of helical groove of said annular member with said helical grooves of said body or output member.

13. The actuator of claim 12 wherein said means for axially moving said annular member is an annular nut threadably connected to said body and slidably engaging said annular member.

14. A fluid-powered linear actuator, comprising:
an elongated body having first and second axial ends;
an elongated output member supported for axial movement relative to said body and restrained agaist rotational movement relative to said body, said output member having a drive portion connectable to an external device extending outward from said first axial body end and having a piston portion disposed within and coaxial with said body and extending toward and terminating short of said second axial body end, said output member drive portion being axially movable in at least a first axial direction in response to application of fluid pressure on said output member piston portion;
an axially reciprocating piston sleeve rotatably and reciprocally disposed within and coaxial with said body and having a sleeve portion and a piston head portion, said sleeve portion coaxially receiving said output member piston portion therewithin, said piston head portion being axially positioned within said body between the terminal end of said output member piston portion and said second axial body end to define with said output member piston portion a first fluid-tight interior body chamber therebetween to a side of said piston head portion toward said first axial body end and to define a secnd fluid-tight interior body chamber to a side of said piston head portion toward said second axial body end;

first transmitting means for transmitting torque between said sleeve portion and said body in response to axial movement of said piston sleeve, including at least one helical groove formed on a radially outward facing wall of said sleeve portion and at least one corresponding helical groove formed on said body coating with each other; and second transmitting means for transmitting axial force between said sleeve portion and said output member in response to axial and rotational movement of said piston sleeve, including at least one helical groove formed on a radially inward facing wall of said sleeve portion and at least one corresponding helical groove formed on a lengthwise portion of said output member piston portion received within said sleeve portion coacting with each other, said grooves of said first and second transmitting means having the same hand with the lead of said groove of said second transmitting means being greater than the lead of said groove of said first transmitting means, the application of fluid pressure to said first chamber producing axial movement of said piston sleeve and output member in axially opposite directions, the application of fluid pressure to said first chamber applying both pressure on said output member piston portion to produce a first axial moving force on said output member drive portion in said first axial direction and pressure on said piston head portion to move in a second axial direction opposite to said first axial direction and rotate said sleeve portion to thereby through said first and second transmitting means produce a second axial moving force on said output member drive portion in said first axial direction, said first and second axial moving forces being in said first axial direction and additive, thereby resulting in an increased axial output force on said output member beyond that produced by fluid pressure on said piston head portion alone, the application of fluid pressure to said second chamber applying an axial moving force on said output member in said second axial direction.

15. A fluid-powered linear actuator, comprising:

a body;

an output member supported for axial movement relative to said body and restrainable against rotational movement relative to said body by an external device to which the actuator is connected, said output member having a drive portion connectable to the external device and having a piston portion disposed within said body, said output member drive portion being axially movable in at least a first axial direction in response to application of fluid pressure on said output member piston portion;

an axially reciprocating piston sleeve rotatably and reciprocally mounted within said body and having a sleeve portion and a piston head portion, said sleeve portion receiving said output member therewithin, said piston head portion being disposed within said body to define with said output member piston portion a first fluid-tight interior body chamber therebetween and to define a second fluid-tight interior body chamber to an opposite side of said piston head portion from said first chamber;

first transmitting means for transmitting torque between said sleeve portion and said body in response to axial movement of said piston sleeve, including at least one helical groove formed on one of said sleeve portion or said body and means for coating with said groove of said first transmitting means to transmit torque; and second transmitting means for transmitting axial force between said sleeve portion and said output member in response to axial and rotational movement of said piston sleeve, including at least one helical groove formed on one of said sleeve portion or said output member and means for coacting with said groove of said second transmitting means to transmit axial force, said grooves of said first and second transmitting means having the same hand with the lead of said groove of said second transmitting means being greater than the lead of said groove of said first transmitting means so that the application of fluid pressure to said first or second chamber produces axial movement of said piston sleeve and output member in axially opposite directions, the application of fluid pressure to said first chamber applying both pressure on said output member piston portion to produce a first axial moving force on said output member drive portion in said first axial direction and pressure on said piston head portion to move in a second axial direction opposite to said first axial direction and rotate said sleeve portion, thereby through said first and second transmitting means producing a second axial moving force on said output member drive portion in said first axial direction, said first and second axial moving forces being in said first axial direction and additive, whereby increased axial output force on said output member results beyond that produced by fluid pressure on said piston head portion alone, the application of fluid pressure to said second chamber applying an axial moving force on said output member in said second axial direction.

16. A fluid-powered linear actuator, comprising:

a body having a plurality of helical grooves with ridges therebetween formed on an inward facing surface portion thereof;

an axially extending drive member supported for axial movement relative to said body and connectable to an external device, said drive member having a plurality of helical grooves with ridges therebetween formed on an outward facing surface portion thereof positioned within said body generally confronting said grooved body inward surface portion, said drive member having a drive portion connectable to an external device and a piston portion disposed within said body, said drive member drive portion being axially movable in at least a first axial direction in response to application of fluid pressure on said drive member piston portion;

means for limiting the rotation of said drive member relative to said body;

a plurality of elongated rollers having circumferential grooves with ridges therebetween;

an axially reciprocating member reciprocally mounted within said body, said reciprocating member rotatably retaining said rollers in fixed axial and circumferential position relative to said reciprocating member during powered operation of the actuator, said rollers being retained by said reciprocating member in circumferentially distributed arrangement between said grooved body inward surface portion and said grooved drive member outward surface portion with at least a first plurality of said rollers in seated engagement with said grooved body inward surface portion and at least a second plurality of said rollers in seated engagement with said grooved drive member outward surface portion for transmitting force between said body, drive member and reciprocating member, each ridge of said rollers being positioned for rolling travel in the corresponding grooves of said body or said drive member; and at least one piston mounted for reciprocal movement and operatively engaging said reciprocating member, said piston having a piston head portion disposed within said body to define with said drive member piston portion a first fluid-tight interior body chamber therebetween and to define a second fluid-tight interior body chamber to an opposite side of said piston head portion from said first chamber, said grooves of said body and drive member having the same hand with the lead of said drive member grooves being greater than the lead of said body grooves so that the application of fluid pressure to said first or second chamber produces axial movement of said piston sleeve and drive member in axially opposite directions, the application of fluid pressure to said first chamber applying both pressure on said drive member piston portion to produce a first axial moving force on said drive member drive portion in said first axial direction and pressure on said piston head portion to move in a second axial direction opposite to said first axial direction and rotate said reciprocating member, thereby through said rollers producing a second axial moving force on said drive member drive portion in said first axial direction, said first and second axial moving forces being in said first axial direction and additive, whereby increased axial output force on said drive member results beyond that produced by fluid pressure on said piston head portion alone, the application of fluid pressure to said second chamber applying an axial moving force on said drive member in said second axial direction.

17. The actuator of claim 16 wherein said first and second pluralities of rollers are in fixed radially and circumferentially position relative to said reciprocating member with said first rollers being radially positioned inward of said second rollers and spaced away from said grooved body inward surface portion to engage said grooved drive member outward surface portion, and said second rollers being radially positioned spaced away from said grooved drive member outward surface portion to engage said grooved body inward surface portion, said first rollers having an axial pitch corresponding to the axial pitch of said drive member helical grooves and said second rollers having an axial pitch corresponding to the axial pitch of said body helical grooves.

18. The actuator of claim 17 wherein said first plurality of rollers are in seated engagement with said second plurality of rollers, and said first and second rollers have a corresponding axial pitch.

19. The actuator of claim 16 wherein said reciprocating member includes a plurality of spindles extending into a circumferential space between said grooved body and drive member surface portions and circumferentially distributed therewithin about said drive member, said spindles each having at least one of said rollers coaxially and rotatably retained thereon and retained against axial movement relative to said spindles, said spindles being retained by said reciprocating member to prevent axial movement of said spindles relative to said reciprocating member during powered operation of the actuator.

20. The actuator of claim 19 wherein said rollers retained on said spindles each have a longitudinally extending substantially coaxial roller bore therethrough rotatably receiving one of said spindles, said axial bore being defined by an interior sidewall, corresponding ones of said roller bore sidewalls and spindles having formed thereon a plurality of confronting and corresponding ball races defining a plurality of ball channels extending circumferentially thereabout, and the actuator further includes a plurality of balls seated in said ball channels to restrict axial movement of said rollers relative to said spindles while permitting free rotation of said rollers on said spindles.

21. The actuator of claim 20 wherein said rollers retained on said spindles each is defined by a plurality of rings disposed on one of said spindles in juxtaposition, each of said rings having a radially outward facing surface portion shaped to form in combination with the other of said plurality of rings said roller grooves and ridges, said rings having first and second axially outward oppositely facing sidewalls each with an axially outward opening circumferential ball groove formed thereon, said first and second sidewall ball grooves being axially spaced apart so that said ring ball grooves on adjacent first and second ring sidewalls of adjacent pairs of said rings define one of said roller ball races.

22. The actuator of claim 21 wherein each of said rings has a central opening forming in combination with the central openings of the other of said plurality of rings said roller bore, said ring central openings being sized to slide axially on said spindle during assembly for positioning of said ring ball groove of said ring first sidewall in engagement with said balls disposed in one of said spindle ball races.

23. The actuator of claim 21 wherein said rings further include a ball loading opening in said ring first sidewall connecting with said first sidewall ball grooves, said opening being sized to receive and pass balls into said ball channel defined by said ring first sidewall ball groove and the corresponding one of said spindle ball races when said ring is positioned on said spindle with said second sidewall ball groove engaging said balls in the corresponding one of said spindle ball races.

24. The actuator of claim 23 wherein said second ring sidewall is sized to block said ball loading opening of an adjacent ring to prevent balls from exiting when in operative position on said spindle.

25. The actuator of claim 19 wherein each of said spindles is supported by a coaxially extending support arm and said reciprocating member includes a sleeve portion having a plurality of circumferentially spaced apart and generally axially extending bore holes therein, said spindle support arms being disposed in said sleeve bore holes.

26. The actuator of claim 25 wherein at least one or more of said spindle support arms are selectively and adjustably axially movable in said sleeve bore holes, and the actuator further includes means for selectively and adjustably axially moving said movable spindle support arms in an axial direction relative to the others of said spindle support arms within at least a limited range to axially move said rollers rotatably retained on said movable spindles relative to said rollers rotatably retained on the other of said spindles and thereby eliminating backlash resulting from said rollers coacting with said body and drive member helical grooves as said piston moves from one axial direction to the other within said body as it reciprocates.

27. The actuator of claim 26 wherein said movable spindle support arms and said sleeve portion bore holes are correspondingly threaded, and said movable spindle support arms are adjustably axially moved by rotation thereof.

28. The actuator of claim 26 wherein at least one or more of said spindle support arms are axially fixedly retained within their corresponding sleeve bore holes, with said movable support arms and said fixed support arms being circumferentially alternately positioned.

29. The actuator of claim 16 wherein said piston and said reciprocating member form an elongated unitary piston sleeve axially aligned within said body.

30. A fluid-powered linear actuator, comprising:
a body having a plurality of helical grooves with ridges therebetween formed on an inward facing surface portion thereof, said grooved body inward facing surface portion having a first pitch diameter and said body helical grooves having a first lead;
an axially extending drive member supported for axial movement and restrainable against rotational movement relative to said body and connectable to an external device, said drive member having a plurality of helical grooves with ridges therebetween formed on an outward facing surface portion thereof positioned within said body generally confronting and radially spaced apart from said grooved body inward surface portion, said grooved drive member outward surface portion having a second pitch diameter and said drive member helical grooves having a second lead, said grooved body inward surface portion and said grooved drive member outward surface portion defining a circumferential space therebetween, said drive member having a drive portion connectable to an external device and a piston portion disposed within said body, said drive member drive portion being axially movable in at least a first axial direction in response to application of fluid pressure on said drive member piston portion;
a plurality of elongated first rollers disposed within said circumferential space and having circumferential grooves with ridges therebetween with an axial pitch corresponding to the axial pitch of said drive member helical grooves and ridges;
a plurality of elongated second rollers disposed within said circumferential space and having circumferential grooves with ridges therebetween with an axial pitch corresponding to the axial pitch of said body helical grooves and ridges;
an axially reciprocating member reciprocally mounted within said body, said reciprocating member rotatably retaining said first and second rollers in fixed axial and circumferential position relative to said reciprocating member during powered operation of the actuator, each of said first rollers being retained by said reciprocating member in circumferentially distributed arrangement in seated engagement with said grooved grooved drive member outward surface portion and out of engagement with said grooved inward surface portion for transmitting force between said drive member and said reciprocating member, with each ridge of said first rollers being positioned for rolling travel in corresponding grooves of said drive member, and each of said second rollers being retained by said reciprocating member in circumferentially distributed arrangement in seated engagement with said grooved body inward surface portion and out of engagement with said grooved drive member outward surface portion for transmitting force between said body and said reciprocating member, each ridge of said second rollers being positioned for rolling travel in corresponding grooves of said body; and
at least one piston mounted for reciprocal movement and operatively engaging said reciprocating member, said piston having a piston head portion disposed within said body to define with said drive member piston portion a first fluid-tight interior body chamber therebetween and to define a second fluid-tight interior body chamber to an opposite side of said piston head portion from said first chamber, said grooves of said body and drive member having the same hand with the lead of said drive member grooves being greater than the lead of said body grooves so that the application of fluid pressure to said first or second chamber produces axial movement of said piston sleeve and drive member in axially opposite directions, the application of fluid pressure to said first chamber applying both pressure on said drive member piston portion to produce a first axial moving force on said drive member drive portion in said first axial direction and pressure on said piston head portion to move in a second axial direction opposite to said first axial direction and rotate said reciprocating member, thereby through said rollers producing a second axial moving force on said drive member drive portion in said first axial direction, said first and second axial moving forces being in said first axial direction and additive, whereby increased axial output force on said drive member results beyond that produced by fluid pressure on said piston head portion alone, the application of fluid pressure to said second chamber applying an axial moving force on said drive member in said second axial direction.

31. The actuator of claim 30 wherein said drive member helical grooves have a hand turn the same as the hand turn of said body helical grooves, and have substantially the same axial pitch as said body helical grooves, and wherein said grooves of said first and second rollers have corresponding axial pitches and circumferentially adjacent ones of said first and second rollers are in seated engagement.

32. The actuator of claim 30 wherein said reciprocating member includes first and second pluralities of spindles extending into said circumferential space and circumferentially distributed therein about said drive member, said first spindles having at least one of said first rollers coaxially and rotatably retained thereon and restrained against axial movement relative to said first spindles, and said second spindles having at least one of said second rollers coaxially and rotatably retained thereon and restrained against axial movement relative to said second spindles, said first and second spindles being axially restrained by said reciprocating member to prevent axial movement of said first and second spindles relative to said reciprocating member during powered operation of the actuator.

33. The device of claim 32 wherein said first and second rollers each have a longitudinally extending substantially coaxial roller bore therethrough rotatably receiving a corresponding one of said first or second spindles, said axial bore being defined by an interior sidewall, corresponding ones of said roller bore sidewalls and spindles having formed thereon a plurality of confronting and corresponding ball races defining a plurality of ball channels extending circumferentially thereabout, and the actuator further includes a plurality of balls seated in said ball channels to restrict axial movement of said rollers relative to said spindles on which said rollers are retained while permitting free rotation of said rollers on said spindles.

34. The actuator of claim 32 wherein each of said first and second spindles is supported by a coaxially extending support arm and said reciprocating member includes a sleeve portion having a plurality of circumferentially spaced apart and generally axially extending bore holes therein, said spindle support arms being disposed in said sleeve bore holes and said bore holes receiving said second spindle support arms being positioned radially outward of said bore holes receiving said first spindle support arms.

35. The actuator of claim 34 wherein at least one or more of said first and second spindle support arms are selectively and adjustably axially movable in said sleeve bore holes, and the actuator further includes means for selectively and adjustably axially moving said movable spindle support arms in an axial direction relative to the others of said spindle support arms within at least a limited range to axially move said rollers rotatably retained on said movable spindles relative to said rollers rotatably retained on the other of said spindles, thereby eliminating backlash resulting from said first and second rollers coacting with said body and drive member helical grooves as said piston moves from one axial direction to the other as it reciprocates.

36. The actuator of claim 35 wherein said movable spindle support arms and said sleeve portion bore holes are correspondingly threaded, and said movable spindle support arms are adjustably axially moved by rotation thereof.

37. The actuator of claim 30 wherein said piston and said reciprocating member form an elongated unitary piston sleeve axially aligned within said body.

* * * * *